United States Patent
Behling

(10) Patent No.: US 6,835,327 B2
(45) Date of Patent: Dec. 28, 2004

(54) SEALANT AND COATING COMPOSITION FOR USE ON WOOD PRODUCTS AND WOOD MATERIAL SO TREATED

(76) Inventor: Joseph Behling, 2545 Riverside Dr., Sault St. Marie, MI (US) 49783

( * ) Notice: Subject to any disclaimer, the term of this patent is extended or adjusted under 35 U.S.C. 154(b) by 20 days.

(21) Appl. No.: 10/105,991

(22) Filed: Mar. 25, 2002

(65) Prior Publication Data

US 2003/0176545 A1 Sep. 18, 2003

Related U.S. Application Data

(60) Provisional application No. 60/363,631, filed on Mar. 12, 2002.

(51) Int. Cl.$^7$ ................................................ C09K 3/00
(52) U.S. Cl. ................... 252/384; 524/310; 106/18; 106/243; 106/244; 106/250; 106/310
(58) Field of Search ................... 252/380, 384; 106/18, 243, 244, 250, 310; 524/310

(56) References Cited

U.S. PATENT DOCUMENTS

| | | | |
|---|---|---|---|
| 4,023,912 A | * 5/1977 | Mahler et al. ................. 401/82 |
| 4,474,608 A | * 10/1984 | Goldberg .................... 106/250 |
| 4,556,701 A | * 12/1985 | Schindler et al. ............. 522/12 |
| 4,560,579 A | 12/1985 | Siadat et al. ................ 427/45.1 |
| 4,560,599 A | 12/1985 | Regen ......................... 428/36 |
| 4,737,385 A | * 4/1988 | Pekar et al. ............. 427/385.5 |
| 4,775,418 A | * 10/1988 | Laemmle et al. ......... 106/38.24 |
| 4,897,291 A | 1/1990 | Kim ........................... 427/393 |
| 5,399,190 A | * 3/1995 | Conradie et al. ............. 106/18 |
| 5,459,174 A | 10/1995 | Merrill et al. ................ 522/35 |
| 5,591,551 A | 1/1997 | Audett et al. ................. 430/18 |
| 6,048,587 A | 4/2000 | Estrin ......................... 427/496 |
| 2003/0066456 A1 | * 4/2003 | Langford .................... 106/244 |

FOREIGN PATENT DOCUMENTS

JP 408053530 A * 2/1996

* cited by examiner

*Primary Examiner*—Cephia D. Toomer
(74) *Attorney, Agent, or Firm*—Young & Basile, P.C.

(57) ABSTRACT

A coating composition and method for applying the same to a wood substrate. The composition includes a major portion of a drying oil such as tung oil in combination with a minor portion of a drying oil such as linseed oil and a wood penetrating compound such as a castor oil derivative. The material is typically held in a suitable carrier medium such as a volatile organic solvent. The material, when applied to wood substrate provides a coating which is wear resistant, durable under extremes in external temperature and provides a unique and aesthetically pleasing luster finish.

26 Claims, No Drawings

SEALANT AND COATING COMPOSITION FOR USE ON WOOD PRODUCTS AND WOOD MATERIAL SO TREATED

RELATED APPLICATIONS

This application claims the benefit of U.S. Provisional Application Ser. No. 60/363,631, filed Mar. 12, 2002.

FIELD OF THE INVENTION

The present invention relates to a composition for use with wood products. More particularly, the present invention relates to a composition for use on wood products which are exposed to external weather conditions to provide at least some weather-resistant preservative effect over broad temperature and environmental exposure ranges. The present invention also pertains to a coating and preservative composition which exhibits aesthetically pleasing optic effects which vary with lighting conditions to which the applied material is exposed. Finally, the present invention relates to a wood material having such a coating integrated therewith and a process for producing the same.

BACKGROUND OF THE INVENTION

Wood products for outdoor use have gained increasing popularity in recent years. Such products include, but are not limited to, structural elements such siding and window frames as well as stairs, decks, walkways, playscapes and smaller elements such as furniture and the like. For many, natural wood siding and the like provides an aesthetically pleasing alternative to brick, vinyl siding and other surface materials. Many consider wood siding and surfaces to be visually harmonious with the surrounding landscape. While wood exterior surfaces are considered desirable, in many instances such exterior surfaces have been difficult to maintain. Exterior exposed wood surfaces can be to harsh external environmental factors such as extremes in temperature, harsh wind, rain, ice and snow, degradation due to exposure to sunlight, or exposure to other environmental agents such as salt and the like.

Exposure to the external environment can cause discoloration and/or deterioration of the coating and the underlying wood material over intervals of months or years. Depending on the severity of exposure and the nature of the underlying wood material, the degradation can be of a more minimal or aesthetic nature as evidenced by undesired bleaching and/or discoloration. However) it is also possible that, in certain wood substrates and under certain conditions, the degradation can eventually affect the underlying wood structure. Severe degradation can be evidenced by erosion of the wood surface as well as splintering, splitting and/or localized rotting, mildew, etc. Such wood degradation can curtail or limit the useful life of the wood product necessitating frequent repair and/or replacement of the wood itself.

In order to eliminate or minimize this, various wood coating and sealing materials have been proposed and employed. Typically, the materials are employed to enhance the color or beauty of the wood product and/or to minimize adverse interaction between the wood product and water. These products typically are formulated to coat the outer surface of the wood product to which they are applied and to impart either a gloss or satin finish to the wood material so treated. One drawback of such products is the inability of the applied coating to withstand extremes in temperature. Thus while a material may provide initial protection, it is unable to withstand the expansion and contraction caused by repeated temperature cycles. Additionally, typical coating materials do not exhibit suitable "wearability" over extended periods. Such coating products do not exhibit significant resistance to wear and erosion caused by exposure to wind, rain, abrasion and the like.

It has also been desirable to employ logs and roughhewn wood as exterior siding material on various buildings. Such material can have an extremely rough and irregular surface which can make it susceptible to weathering and degradation while also making it extremely difficult to protect effectively. Various lacquers and coating products have been proposed for use on such materials. They have been fraught with various drawbacks such as short lifespan and/or producing high glare surfaces when viewed in direct sunlight. Such high glare surfaces detract from the appeal of the natural roughhewn surface of the material.

Thus it would be desirable to provide a coating composition which is aesthetically pleasing and can be used with various types of wood in a variety of end use applications. It would also be desirable to provide a composition which is durable over a wide range of temperatures and over multiple temperature change cycles. It would also be desirable to provide a composition which would enhance and preserve the underlying wood substrate and would minimize or prevent at least some deleterious interaction between the wood substrate and the surrounding environment. Finally, it would be desirable to provide a wood material with a weather and wear resistant outer surface which has a durable coating composition intimately integrated into the wood surface and in continuous overlying relationship thereto as well as a method for producing such wood material.

SUMMARY OF THE INVENTION

A composition for application on a wood surface is proposed which comprises a major portion of an unsaturated glyceride derivative of at least one of stearic acid and eleostearic acid in mixture with a minor portion of an unsaturated glyceride derivative of at least one of linoleic acid, linolenic acid, and oleic acid; a minor portion of wood penetrating material comprising at least one $C_{16}$ to $C_{20}$ fatty acid derivative. The major and minor portions are preferably present in admixture with an aliphatic hydrocarbon solvent having a boiling point between 200° F. and 350° F.

The major portion of an unsaturated glyceride derivative of at least one of stearic acid and eleostearic acid glyceride derivative is present in an amount sufficient to provide at least some abrasion resistance and water impermeability. The minor portion of the unsaturated glyceride derivative of a fatty acid selected from the group which includes linoleic acid, linolenic acid, and oleic acid is present in an amount sufficient to maintain the materials in suitable admixed relationship during application of the composition. The liquid hydrocarbon is present in an amount sufficient to enhance penetration of the composition components into grain structure and interstices present in the wood substrate. The aliphatic hydrocarbon solvent component is present in an amount sufficient to maintain the major portion and minor portions in dispersed relationship with one another.

A method for preparing and preserving a wood surface is also proposed in which an amount of a composition containing an unsaturated glyceride derivative of at least one of stearic acid and eleostearic acid, an unsaturated glyceride derivative of a fatty acid from the group which includes linoleic acid, linolenic acid, and oleic acid; a wood penetrating material comprising at least one $C_{16}$ to $C_{20}$ fatty acid derivative; and an aliphatic hydrocarbon solvent component having a boiling point between 200° F. and 350° F. is brought into contact with an exposed wood surface in a plurality of discrete discrete application steps. The amount of the composition applied in at least one first application step is that sufficient to saturate the wood region adjacent to the wood surface. After application, the wood surface is permitted to dry. At least one additional application of the composition is applied over the wood surface after thorough drying. The quantity of material applied in the at least one additional amount is sufficient to draw into the wood region adjacent to the surface of the wood and to impart a light finish over at least a portion of the exterior wood surface. At least one final coat may be applied in over lying relationship to the additional applied coat. The at least one final coat is applied in an amount sufficient to impart a luster quality to the applied coating material.

Other applications of the present invention will become apparent to those skilled in the art when the following description of the best mode contemplated for practicing the invention is read in conjunction with the accompanying drawings.

DETAILED DESCRIPTION OF THE PREFERRED EMBODIMENT

The present invention is predicated upon the unexpected discovery that use of a mixture of organic materials typically known as drying oils in specific combination with wood penetration compounds having an absorptive affinity with the wood substrate material will produce a coated wood material which is resistant to weathering, environmental degradation, extremes in temperature and humidity. The resulting coating is a material which possesses notable abrasion resistance as well as pronounced durability during repeated freeze/thaw cycles. The coated wood substrate exhibits a clear lustrous finish having a high degree of refractivity in direct sunlight, thus providing an optically pleasing, low-glare surface.

The composition of the present invention includes ingredients which are active relative to the wood substrate; are retained relative to the wood substrate after application thereto. The composition also includes a non-active carrier medium. Typically the non-active carrier medium is an organic liquid which having sufficient volatility to evaporate after application on the wood substrate.

The composition of the present invention contains, as a major portion, an unsaturated glyceride derivative of at least one fatty acid from the group which includes stearic acid and eleostearic acid. The major portion is in intimate admixture with a minor portion of an unsaturated glyceride derivative a fatty acid from the group which includes linoleic acid, linolenic acid, and oleic acid and a wood penetrating agent comprising at least one sulfonated derivative of a $C_{16}$ to $C_{20}$ fatty acid.

These components of the composition are maintained in a suitable volume of organic carrier medium sufficient to maintain the aforementioned components in a generally dispersed state relative to one another so as to permit effective application of the components to the wood substrate. Suitable organic carrier media are aliphatic hydrocarbon solvents having a boiling point between 200° F. and 350° F. The aliphatic hydrocarbon solvent is present in an amount sufficient to maintain the major portion and minor portions in dispersed relationship with one another. The term "dispersed relationship" as used herein is defined as the random, essentially homogeneous, relationship of the various components of the composition relative to one another such that the various materials in the major and minor portions of the active portion are brought into intimate interactive contact with one another upon application to the wood substrate.

The various components need not be solubilized or dissolved in one another or in the carrier medium. It is sufficient that the various components are contained in a fluid state relative to one another such that application of the composition of the present invention on a suitable wood substrate will result in an essentially uniform distribution of the various chemical constituents of the composition of the present invention.

The composition of the present invention contains a major component which is composed of an unsaturated glyceride derivative of suitable fatty acid. Typically, the fatty acid of choice will be a naturally derived saturated or unsaturated fatty acid. The fatty acid employed in the major portion is at least one of conjugated or non-conjugated stearic acid, eleostearic acid, palmitic acid, and myristic acid, with at least one of eleostearic acid and stearic acid being preferred, and eleostearic acid being most preferred.

Suitable glyceride derivatives of fatty acid used successfully in the composition of the present invention are typically referred to as drying oils. Drying oils are a known class of chemicals which includes, for example, chisia oil, fish oil, hempseed oil, linseed oil, oiticica oil, perilla oil, poppyseed oil, safflower oil, soybean oil, sunflower oil, tung oil, and walnut oil. In the composition of the present invention, the major portion of the composition is a tung oil material.

It is preferred that the tung oil component is an admixture of various grades of commercially available tung oil. In the tung oil admixture employed in the major component, at least one component is high-grade tung oil which is present in admixture with medium-grade tung oil. As used herein, the term "high-grade tung oil" is defined as tung oil which contains greater than 70% eleostearic acid, with eleostearic acid contents of at least 80% being preferred. "Medium-grade tung oil", as that term is used herein is defined as tung oil having an eleostearic acid content between about 50% and about 69%, with an eleostearic content between 65% and 79% being preferred. The balance of the high-grade tung oil material may be any material which does not compromise the performance of the eleostearic acid component. The balance of the tung oil material is typically a compatible material which includes, but is not expressly limited to, materials such as non-conjugated or conjugated palmitic acid, stearic acid, lauric acid, myristic acid, pelargonic acid, and isodecanoic acid.

Without being bound to any theory, it is believed that the admixture of high-grade and medium-grade tung oil components in the same formulation provides salutary properties such as wear resistance and an exterior grade finish with a degree of hardness and abrasion resistance which approaches furniture grade but has elasticity and flexibility in response to changes in temperature and weather conditions not found in either high-grade or medium-grade tung oil material alone.

Additionally, use of medium-grade tung oil has been found to contribute unexpected beneficial results to formulation stability and application ease and uptake of the composition of the present invention into the underlying wood substrate and the integration of the material in to the interstices and surfaces of the wood substrate in a continuous and stable manner. Use of medium-grade tung oil in combination with high-grade material has resulted in unexpected benefits regarding formulation stability and the ability to successfully integrate minor portions and various optional additives in the composition of the present invention. It has also been found, quite unexpectedly, that the integration of medium-grade tung oil in combination with the minor portion components in the composition of the present invention reduces the glossy/glaring effect which is typically present when compositions containing high-grade tung oil are employed. The integration of medium-grade tung oil with the high-grade constituent unexpectedly provides wearabillty and durability heretofore not found in such tung oil materials.

The degree and nature of the performance enhancement was highly unexpected over previously available materials or over predicted results upon admixture. Without being bound to any theory, it is believed that the resulting composition upon application forms a polymeric material which retains "micro-islands" of polymerized high-grade tung oil integrated into the structure of the more prevalent polymerized high-grade tung oil. The term "micro-islands" is employed to attempt to explain the theoretical phenomenon in which the resulting polymerized material retains identifiable, though discrete, regions which result from high-grade tung oil; i.e. have identifiable regions integrated in or co-polymerized with the matrix which have elevated concentration or instances of eleostearic acid suitably integrated therein. These regions are sufficiently small and sufficiently dispersed in the resulting polymeric matrix that they enhance the function of the resulting polymeric coating without unduly compromising homogeneity or standard performance characteristics. It has been found that the resulting polymeric coating exhibits toughness and durability heretofore seen only with pure high-grade tung oil compositions. However, the material also exhibits an ability to withstand prolonged exposure to extremes in weather conditions including temperatures as low as $-20°$ F. and as high as $110°$ F. as well as seasonal temperature variations which can range between such extremes. The composition of the present invention, when employed as wood substrate coating, has as useful life in excess of five years. Heretofore, it was generally believed that conventional tung oil compositions would be useful at temperature ranges between about $20°$ F. and $90°$ F. and would have a maximum useful life of about 2 years.

Without being bound to any theory, it is believed that materials employing or based on tung oil lacked the strength and flexibility to be employed in any significant manner in exterior wood coating applications. Where employed in such exterior applications, the surface characteristics of the resulting coating lacked the desirable furniture grade characteristics due to the necessity of incorporating materials which would enhance UV stability and wear resistance as well as flexibility during freeze/thaw cycles.

High-grade tung oil may be formulated into the composition of the present invention in any suitable manner. Suitable tung oils are is commercially available from a variety of sources. Typically, high-grade tung oil is diluted in a suitable carrier media such as aliphatic hydrocarbon solvent. Examples of suitable high-grade tung oil include material commercially available from Behr Process Corporation of Santa Ana Calif. under the trade name 45 SUPER SPAR GLOSS. It is believed that such commercially available tung oil material is composed high-grade tung oil present in admixture with an aliphatic hydrocarbon solvent or solvents. Such aliphatic solvents provide a ready carrier medium which retards and/or controls polymerization of the tung oil during storage and transport and provides a controlled evaporation upon exposure to oxygen in the surrounding atmosphere after application to control the rate of polymerization of the tung oil.

Typically, the aliphatic hydrocarbon solvent present in admixture with tung oil in suitable commercially available materials will have a boiling range between $200°$ F. and $350°$ F. and a specific gravity of approximately 0.88 to 0.95. It is to be understood that such aliphatic solvent materials present in commercially available tung oil preparations will be those which can be integrated into the composition of the present invention.

Materials such as 45 SUPER SPAR GLOSS are proprietary compositions. It is believed that the tung oil component of the commercially available composition contains significant quantities of high-grade or refined tung oil. It is theorized that such tung oil constituent contains significant percentages of eleostearic acid derivatives. The resulting material, if used alone, will polymerize to a hard surface which will exhibit an extremely high gloss. The resulting material also tends to lack flexibility and is prone to blistering and cracking when applied to exterior wood surfaces exposed to outdoor applications.

Commercially available materials such as 45 SUPER SPAR GLOSS are believed to contain between 20% and 40% by volume aliphatic hydrocarbon solvent; with amounts of approximately 34–36% being most common. The aliphatic hydrocarbon solvent constituent is typically aliphatic solvent or mixture of solvents having a boiling range which falls within a range between $200°$ F. and $350°$ F. At least a portion of the aliphatic solvent component of commercially available high-grade tung oil compositions is composed of Stoddard solvent (CAS 8052-41-3) or other suitable petroleum distillate material which is clear, free of suspended matter and undissolved water. Such petroleum distillates typically have a minimum flash point of $100°$ F. (37.7 C) and a distillation range of more that 50% over at $350°$ F.; 90% over at $375°$ F. (177 C) and an end point below $410°$ F. (232C).

Commercially available high-grade tung oil compositions will also include adjunct solvents such as Cellosolve type materials. Cellosolve type materials are defined herein as ethylene glycol monoalkyl ethers such as ethylene glycol monomethyl ether (CAS 109-86-4), ethylene glycol monoethyl ether (CAS 110-80-5), ethylene glycol monopropyl ether (CAS 2807-30-9) and the like, as well as materials which have similar properties and characteristics. Typically such adjunct solvents are present in commercially available tung oil formulations in an amount between 2% and 10% by volume with an amount between about 5% and 7% by volume being preferred.

Commercially available high-grade tung oil materials useful in the composition of the present invention may also contain material are employed to retard "blushing" in lacquers and the like such as various Cellosolve acetates, for example, ethylene glycol monoethyl ether acetate (2-ethoxyethyl acetate, CAS 111-15-9), ethylene glycol monomethyl ether acetate (CAS 110-49-6) and the like. Such materials are typically present in amounts between 1% by volume and 5% by volume, with amounts between 2% and 4% by volume being preferred.

Commercially available high-grade tung oil formulations suitable for use in the composition of the present invention may also contain minor amounts of various other organic solvent carriers; for example short chain alcohols such as n-propanol (CAS 71-23-8). Such other solvent carriers are typically present in amounts between 1% and 5% by volume, with amounts between about 2% and 4% by volume being preferred. The commercially available high-grade tung oil compositions may also contain other compatible materials such as cumenes and cumene derivatives as well as various isomers of trimethyl benzene (CAS 25551-13-7) including, but not limited to, hemimellitene, pseudocumeme, and mesitylene.

It is also believed that commercially available high-grade tung oil compositions such as 45 SUPER SPAR, GLOSS will contain suitable proprietary antioxidants, UV inhibitors and the like. Also optionally present in such high-grade tung oil compositions are proprietary compounds which serve as mildew inhibitors and fungicides. Such materials may be successfully and advantageously integrated into the composition of the present invention.

The composition of the present invention will also contain suitable quantities of tung oil having grades below that which would typically be classified as high-grade tung oil material. Such material is classified, for purposes of the present invention, as "medium-grade tung oil". Typically such medium-grade tung oil compositions, upon application, lack significant abrasion resistance as well as the ability to hold up under harsh weather or climate conditions. Without being bound to any theory, it is believed that this is due to the nature of the tung oil constituent and the manner of its processing. It is believed that the tung oil component employed in medium grade tung oil compositions is a lesser grade product of the tung oil production process. It is believed that the tung oil which is employed contains lower concentrations of eleostearic acid than that found in the high-grade material, with concentrations of eleostearic acid typically being between about 50% and about 69% by volume, and concentrations of eleostearic acid preferably being between 65% and 79% by volume.

It is believed that medium-grades of tung oil exhibit certain levels of flexibility and elasticity when applied on wood surfaces which are not typically evidenced in high-grade materials. However such elasticity appears to contribute to degradation and breakdown of the applied coating when the material is exposed to temperature variation cycles. This breakdown is most pronounced in cycles occurring at temperature extremes such as would occur in desert conditions or in climates such as those in the northern latitudes of the temperate region in the northern hemisphere. Thus, medium-grade tung oils have been considered undesirable for use in harsh climate wood coating applications, as they would typically require annual or, at best, biannual reapplication to maintain desired levels of protection and aesthetic appeal.

This invention is predicated on the unexpected discovery that integration of medium-grade tung oil in a composition with high-grade tung oil material will provide a composition of superior performance and function. Even more unexpectedly, the composition of the present invention which includes high-grade tung oil in admixture with medium-grade tung oil exhibits greater durability wear resistance and coating life over single-grade tung oil compositions.

Medium-grade tung oil suitable for use in the present invention may be material which may be diluted with suitable carrier material as would be necessary or desirable to retard or prevent premature polymerization of the tung oil material. Alternately, the medium-grade tung oil can be obtained form various sources in preformulated mixtures. Examples of suitable commercially available preformulated mixtures include, material commercially available for Behr Process Corporation of Santa Ana Calif. under the trade name 31-13 CEDAR GLOSS or 31-12 SLR CLEAR GLOSS. Such material typically contains medium-grade tung oil present in admixture with an aliphatic hydrocarbon solvent and trace amounts of various other organic additives. The aliphatic hydrocarbon solvent believed to be employed in typical commercially available tung oil materials preferably has a boiling range between 200° F. and 350° F. and a specific gravity of approximately 0.88 to about 0.95. Preferably at least a portion of the aliphatic solvent component of commercially available high-grade tung oil compositions is composed of Stoddard solvent (CAS 8052-41-3) or other suitable petroleum distillate material which is clear, free of suspended matter and undissolved water. Such petroleum distillates typically have a minimum flash point of 100° F. (37.7 C) and a distillation range of more that 50% over at 350° F.; 90% over at 375° F. (177 C) and an end point below 410° F. (232C). Typically such material will compose between about 25 and about 40% of the commercially available medium-grade tung oil composition.

Commercially available medium-grade tung oil compositions such as 31-13 CEDAR GLOSS or 31-12 CLEAR LIQUID RAWHIDE GLOSS are also believed to contain minor amounts of various other additives such as cumene, various isomers of trimethylbenzene and various Cellosolve-type materials; for example, ethylene glycol monoalkyl ethers such as ethylene glycol monomethyl ether (CAS 109-86-4), ethylene glycol monoethyl ether (CAS 110-80-5), ethylene glycol monopropyl ether (CAS 2807-30-9) and the like, as well as materials which have similar properties and characteristics.

In the composition of the presenting invention, the tung oil component is an admixture of major portions of medium grade tung oil compositions with minor portions of high-grade tung oil compositions in a ratio between 1:3 and 1:5 parts high-grade tung oil to medium-grade tung oil respectively.

In the preferred embodiment of the present invention, the medium grade tung oil component is composed of a combination of major portions of 31-12 CLEAR LIQUID RAWHIDE GLOSS in combination with minor portions of 31-13 CEDAR GLOSS. It has been found that the combination of the two different commercially available medium-grade tung oil compositions produces a material with an affinity to the wood substrate and an enhanced ability to being drawn in to the wood substrate proximate to the exterior surface of the material. Where an admixture of medium-grade commercially available tung oil compositions are employed it is preferred that the ratio of 31-12 CLEAR RAWHIDE GLOSS to 31-13 CEDAR GLOSS be between about 50:1 and about 70:1.

Suitable wood penetrating components employed in the composition of the present invention are those which compatible in admixture with the tung oil components of the present invention and exhibit an affinity to the wood substrate material such that at least a portion of the wood penetrating component will be absorbed into the wood substrate in a manner which renders the wood amenable to accepting penetration and polymerization of the tung oil components. Suitable wood penetrating materials can include organic solvent materials which when used alone have a stripping action. By "stripping action", it is meant that the material of choice appears to remove or inactivate various compounds found in the wood material proximate to the surface which would ordinarily impede the uptake of the tung oil materials of the composition of the present invention. Without being bound to any theory, it is believed that the wood penetrating component also carries tung oil components with it as it penetrates the wood substrate. The wood penetrating material may include a solvent or organic carrier which has sufficient volatility that the material will evaporate or otherwise volatilize in a manner which will permit the tung oil materials to polymerize. Without being bound to any theory, it is believed that tung oil materials thus delivered polymerize in a manner which integrates at least a portion of the wood substrate into the polymeric matrix. Thus the resulting wood product so treated can exhibit a transitional region characterized by a unique wood substrate/polymerized tung oil matrix. The depth of this transitional region is determined by the degree of penetration of the wood penetrating component and the tung oil carried therewith. Penetration can be a function of the wood penetrating component as well as the porosity and general grain structure of the wood substrate to be treated. Typically the degree of penetration may be a small as 0.1 mm. However greater depths of penetration are contemplated. Thus it is considered within the purview of this invention to achieve penetration depths of 1.0 mm with penetration depths as great as 0.5 mm being preferred.

The material of choice will be one, which will be one which achieves penetration without unduly stripping the grain structure of the wood. The material of choice will preferably be one which can enhance the definition of the grain structure of the wood substrate in certain situations. Without being bound to any theory, it is believes that the wood penetrating material may be capable of facilitating the preferential uptake of tung oil or trace constituents contained therewith in a manner which may accentuate the grain structure of the wood substrate.

The wood penetrating material of choice may be present in suitable carrier solvent having sufficient volatility under atmospheric conditions to permit the controlled evaporation of the solvent in a manner harmonious with the gradual concentration of the tung oil component and its polymerization. In the preferred application process of the present invention, the composition is applied to the wood substrate in a series of application steps in which the material is sequentially applied, allowed to dry and polymerize followed by an additional coat of the composition. The solvent employed with the wood penetration material of choice is preferably one which possesses sufficient volatility to evaporate at a rate which permits polymerization of the tung oil materials in a controlled and appropriate manner. Without being bound to any theory, it is believed that the wood penetrating material solvent of choice possesses appropriate solvency characteristics which may enhance the interface between each succeeding layer so applied.

The wood penetrating material preferably contains a suitable $C_{16}$ to $C_{20}$ fatty acid derivative present in the suitable hydrocarbon-based carrier medium. The material of choice is preferably a castor oil derivative material from the group which includes at least one of alkali metal salts of sulfonated ricinoleic acid, alkali metal salts of sulfated esters of dicarboxylic acids, and various alkyl derivatives of sulfonated $C_{16}$ to $C_{20}$ fatty acids. Suitable materials will typically have a vapor pressure greater than about 1.0 mm Hg at 70° F. and evaporation rates which are generally slower that ethyl ether. Suitable wood penetration materials include materials marketed under trade names such as PENETROL/MARINE PENETROL, commercially available from The Flood Company of Hudson, Ohio. Materials such as PENETROL/MARINE PENETROL are believed to contain compounds such as sodium and potassium salts of sulfated esters of dicarboxylic acids, sodium and potassium salts of sulfo-ricinoleic acids and/or alkyl ricinoleate sulfate in which the alkyl group contains two to six carbon atoms. The aforementioned commercially available compositions may also include various proprietary compounds as are compatible in the present invention. Typically, in commercially available materials, the aforementioned materials are present in a suitable carrier solvent such as a Stoddard solvent carrying medium.

Such commercially available materials are typically employed to treat rusted metal surfaces and to condition surfaces such as metal, wood or fiberglass. Heretofore materials containing ricinoleic acid and its derivatives such have been admixed with various paint substances to control paint set-up time. While various materials containing ricinoleic acid derivatives have been employed with various paints, use with materials containing tung oil has been problematic. Conventional compositions having tung oil and ricinoleic acid derivatives in admixture rapidly thicken or become gummy to the point where the resulting composition cannot be effectively applied to the wood surface. Without being bound to any theory, it is believed that the ricinoleic acid derivatives react adversely with tung oil material to induce premature and/or undesirable polymerization which results in thick and/or gummy material which is difficult to apply and lacks significant shelf life. It has been found, quite unexpectedly, that ricinoleic acid derivatives such as the materials present in PENETROL-type products can be successfully integrated in to the composition of the presenting invention without triggering the adverse thickening and/or gumming generally expected in such combinations. Without being bound to any theory, it is believed that this integration is due, at least in part, to the presence of linoleic, linolenic and/or oleic acid and its derivatives which appears to act as a mediating agent in the compsotion of the present invention.

The composition of the present invention also includes suitable carrier medium. The carrier medium of choice will be one which can maintain the medium-grade and high-grade tung oil components in intimate admixed contact suitable for essentially homogeneous application to a wood substrate. The material of choice will preferably be a solvent which will exhibit essentially uniform controlled volatilization and/or absorption into the wood substrate upon application of the composition of the present invention to the underlying wood material. "Essentially uniform volatilization" and/or "absorption" as employed herein are directed to phenomena in which the amount of solvent present in the applied composition is gradually reduced such that polymerization of the tung oil proceeds as the concentrating tung oil material is exposed to oxygen. It is to be understood that initial applications of the composition of the present invention result in greater absorption of the aliphatic solvent material while later applications of the aliphatic composition result in greater degree of volatilization of the solvent material as earlier applied composition achieves at least a degree of sealing of the wood substrate proximate to the wood surface eliminating at least some of the ability of the wood to absorb later applied composition into its matrix.

The amount of carrier medium employed relative to tung oil is an amount sufficient to maintain the various constituents in an appropriately admixed relationship to one another. As used herein, the term "appropriate admixed relationship" is taken to include conditions under which the various components are maintained in admixed relationship to one another for an interval sufficient to permit application of the material to the wood substrate. The various component materials may be in suitable dispersed state or, alternately, the material may be admixed such that suitable agitation or mechanical mixing of the composition will achieve appropriate admixture prior to application.

The carrier medium of the present invention is preferably one which will exhibit essentially uniform controlled volatilization of the carrier solvent upon application of the coating composition of the present invention to the underlying wood material. The carrier medium of choice will, preferably, be a hydrocarbon-based solvent which is liquid under ambient temperature conditions. Suitable materials will typically have a vapor pressure greater than about 1.0 mm Hg at 70° F. and evaporation rates which are generally slower that ethyl ether. Suitable hydrocarbon solvent materials are preferably those based on aliphatic hydrocarbons, with materials such as Stoddard solvent materials being preferred. These hydrocarbon-based solvent materials can be separately added as a component of the composition of the present invention or may be present as the solvent material for the commercially available medium-grade and high-grade tung oil components employed in the composition of the present invention. Preferably, the aliphatic solvent will be present in the initial composition in an amount between 20% by volume and 50% by volume with an amount between 30% and 40% being preferred.

The composition of the present invention may also include suitable compatibilizing agents which will facilitate the successful admixture and function of the various other composition components. Suitable compatibilizing agents are generally classified as drying oils such as linseed oil (CAS 8001-26-1) and the like. Suitable materials typically contain glycerides of linoleic acid, oleic acid, linolenic acid, and saturated fatty acids with the drying properties typically due to the presence of the linoleic and linolenic acids. Preferably, the compatibilizing agent will be a "boiled" material. "Boiled," as that term is used herein, contains small quantities of driers added to linseed oil to accelerate the drying process. Such "driers" are typically oxidization catalysts and commonly include salts of metals with a valence of two or greater (such as cobalt, manganese, cerium, lead, chromium, iron, nickel, uranium and zinc) and often further include unsaturated organic acids. In materials such as boiled linseed oil, these drying agents can be prepared as the linoleates, naphthenates and resinates of the above listed metals.

In addition to the compatibilizing capacity of the linseed oil material, it has been found quite unexpectedly that the presence of linseed oil, particularly boiled linseed oil, in the process of the present invention unexpectedly produces a coating material with reduced glare characteristics. This is particularly noticeable in intense or direct sunlight where the material of the present invention exhibits a luster/satin finish. Without being bound to any theory, it is believed that the presence of the boiled linseed oil material interacts in the drying process of the tung oil material contributing to the luster appearance of the resulting coating.

It is also within the purview of the present invention to include various pigments or color enhancers as will as additives which enhance UV resistance, moisture impermeability, and/or resistance to growth of molds, mildews and the like. Such materials may be separately added or may be present in commercial tung oil compositions integrated into the composition of the present invention.

The composition of the present invention typically will contain between 40% and 50% by volume medium-grade tung oil, with an amount between 42% and 48% by volume being preferred. The high-grade tung oil component of the composition of the present invention is typically present in an amount between 10% and 20% by volume with an amount between about 12% and about 16% being preferred and amount between about 13.5% and about 15% high-grade tung oil being preferred. The composition of the presenting invention also contains between 1% and 4% by volume linseed oil with an amount between about 2% and 3% by volume being preferred. The castor oil derivative material is present in an amount between about 1% and 3% by volume with an amount between about 1.5% and about 2% by volume being preferred. The balance of the composition of the present invention is carrier solvent.

Given the reactive and interactive nature of various components of the composition of the present invention, it is desirable to prepare the composition in a manner which will minimize or eliminate the potential for adverse interaction between the various components during the formulation stages. It has been found that the sequential introduction of the various components can enhance performance characteristic including shelf life and application readiness of the composition of the present invention.

The composition of the present invention may be formulated immediately prior to application in the wood substrate. However, the composition of the present invention possesses sufficient shelf stability to be prepared in advance and transferred to appropriate containers for storage until required. Suitable containers fluid tight, non-reactive with the composition stored therein and essentially air tight so as to prevent or minimize evaporation of the carrier solvent employed in the composition.

Preferably, the composition of the present invention is formulated by the sequential addition of the various components in a manner such as that which follows. A medium-grade tung oil formulation is prepared or obtained such that the medium-grade tung oil is dissolved or suspended in a suitable carrier solvent such as Stoddard solvent. The ratio of medium-grade tung oil to solvent is between 1:1 and 3:1 with a tung oil to solvent ratio of approximately 2:1 being preferred.

A mixture of high-grade tung oil and carrier solvent is also prepared in which the ratio of high-grade tung oil to carrier solvent is between 1:1 and 3:1 with a ratio of about 1.5:1 and 2.5:1 being preferred. Nine parts of the high-grade tung oil/solvent mixture are gradually added to fourteen parts of the medium-grade tung oil/solvent mixture with low energy mixing. The high-grade tung oil and solvent mixture will typically be slightly heavier than the medium grade tung oil and solvent mixture. Thus addition of the high-grade tung oil material to the medium grade material will cause the high-grade material to pass through the medium grade material thereby enhancing the mixing action of the two materials as they are exposed to low energy mixing.

Low energy mixing can occur by any suitable means. It is contemplated that low energy mixing can occur by a suitable low agitation mechanism such as a rotary mixer or the like. However other mixing means are considered to be within the purview of the present invention.

Upon sufficient mixture of the medium and high-grade tung oil portions, one part boiled linseed oil is added to the resulting mixture. Simultaneous with, or immediately subsequent to the addition of the boiled linseed oil, one part of the wood penetrating material is added with appropriate mixing. Typically the wood penetrating material added is a castor oil derivative present in a ratio between 1:3 and 1:1 castor oil derivative to carrier solvent, respectively.

Upon integration of the linseed and castor oil derivative components, an additional fourteen parts of medium-grade tung oil in admixture with carrier solvent is added to the mixing formulation. The resulting material may be used immediately or may be stored in suitable containers. Where the material is stored in containers, it is preferred that the material be boxed or stirred prior to use to insure that no settlement has occurred. Typically, resulting material can be stored at essentially ambient temperatures for a period of greater than five years and still retain its utility as a wood coating product provide that periodic agitation is employed.

The present invention also contemplates the method of applying the composition of the present invention to a suitable wood substrate and the resulting coated wood substrate itself In the application method of the present invention, suitable wood substrate is any wood material such as planking, logs, shingle material or the like of any wood stock or grade. Preferably, the wood substrate material is a material which is suitable for use in outdoor applications. The wood substrate material of choice may be pressure treated to resist bugs, mildew and the like. The wood substrate of choice will be one in which the moisture content is carefully controlled. For optimum results, the composition of the present invention is not applied at moisture values between 8% to 10%. Wood moisture values can be determined by suitable moisture meter checks as would be know to the skilled artisan.

For optimum performance of the finished coating, the composition of the present invention should be applied under ambient conditions of low humidity and moderate temperature. Additionally for maximum performance and aesthetic appeal, the wood substrate should be corrected as to undue weatherization. Additionally, any areas of mildew, water damage and the like should be repaired prior to the application of the composition of the present invention. If desired or required, the surface of the wood substrate may be prepared to facilitate application of the composition of the present invention. This can include removal of any dirt or staining as well as surface abrasion by procedures such as corn blasting, sandblasting or the like.

In applying the composition of the present invention, a film of material is applied to the surface of the prepared wood substrate. The applied material is drawn into the surface of the wood substrate where the gradual evaporation and/or saturation of the carrier solvent into the wood occurs with accompanying polymerization of the composition. The polymerization event occurs in and around the cellulose material of the wood substrate. It is believed that the polymerizing tung oil and minor constituents also integrates any reactive sites present in the cellulose material into the growing polymeric matrix.

The amount of material applied in the initial coat is typically an amount sufficient to draw into the wood substrate. In many instances, it will appear that the initial coat has disappeared into the wood. The applied material is allowed sufficient time to polymerize and for the carrier solvent to evaporate. After which the application process is continued.

The second coat is applied in essentially the same manner as the first coat. The second application is an amount sufficient to draw into the wood substrate. Typically the saturation or depth of the second coat will be less than the first coat. The material will polymerize as the carrier solvent devolves. Polymerization occurs in a manner such that the newly applied material integrates with cellulosic material of the wood substrate as well as the previously applied material which has achieved polymerization. Without being bound to any theory, it is believed that the material can achieve appropriate adhesion with previously applied material such that an essentially uniform coating material is formed. The amount of composition applied in the second layer is typically sufficient to penetrate the wood substrate and provide a light finish on the top of the exterior of the wood.

In order to achieve optimum coating using the composition of the present invention, the application method of the present invention contemplates the application of a third overlayment coating layer on top of the previously applied and dried coating layer. The amount of composition applied is sufficient to coat the wood surface and the dried composition which has been previously applied. The newly applied material is sufficient to dry to provide a coating layer of sufficient depth to provide a continuous outer layer of coating material.

Preferably, the application method of the present invention includes the application of a fourth layer over the dried previously applied layer. The application of the fourth layer provides added protection for the wood substrate. It has been found, quite unexpectedly, that application of this fourth and final layer interacts with material in the previously applied layer to provide a luster quality to the material so applied. Without being bound to any theory, it is believed that trace materials in the composition and quite possibly the interactive polymerization of high-grade and medium-grade tung oil create a material which, when applied over the coating layers just enumerated, orients in such a way to form a luster quality to the coating which is distinct from the glossy surface characteristics typically produced with tung oil materials.

Application of the composition of the present invention is accomplished by a method which can lay down a continuous portion of the composition of the present invention. The material is preferably applied in a manner which prevents or minimizes agitating of the material as a result of the application process. Preferably, the material is applied by a roller applicator or suitable brush technique which minimizes introduction of brush strokes and/or the introduction of air bubbles and the like. The preferred method of application contemplates the use of a suitable nap roller together with complete back brush of each coat behind the roller.

The application method of the present invention also contemplates the use of the composition of the present invention in conjunction with various wood stains and preparative materials as would be compatible with the composition of the present invention. Examples of suitable and compatible stains include, but are not limited to, materials such as products commercially available under trade names such as PENEFIN.

To further illustrate the present invention, reference is directed to the following Examples. Such Examples are illustrative and are not to be construed as limitative of the present invention.

EXAMPLE I

A coating composition of the present invention was prepared. Seven quarts of a medium-grade tung oil composition commercially available as BEHR # 31-12 was placed in a mixing vessel at an ambient temperature of approximately 70 degrees F. Four quarts and one pint of a high-grade tung oil composition commercially available as BEHR SPAR #45 was added with moderate mixing. After mixing, one pint of a commercially available linseed oil composition, E-Z BOIL LINSEED OIL was added followed by one pint of a penetration material believed to contain castor oil derivatives, commercially available as MARINE PENETROL was added with moderate mixing. After the materials were mixed, seven quarts of medium grade tung oil commercially available as BEHR 31-12 were added with moderate stirring.

A portion of the resulting material was analyzed and was found to have a specific gravity of 0.89, a boiling range between 293° F. and 350° F. and a flash point of 108° F. (TCC method).

A portion of the material was placed in airtight containers which were non-reactive with the chemical composition. The material in the containers was observed periodically to determine settlement and/or decomposition. A slight degree of separation was detected after two months. It was found that the separation could be readily reversed by boxing or moderate stirring.

Material was retained in air tight containers and observed at intervals of six months and one year. After boxing or moderate stirring to reverse minor separation, the material was applied to wood substrate. No appreciable differences were detected in the application of retained materials over material newly formulated. Thus, the material was determined to be shelf stable after six months and one year.

EXAMPLE II

Additional material was prepared according to the procedure outlined in Example I. The material was applied to wolmanized pine wood substrate. Application occurred using an 11/4-inch nap roller followed by back brushing. The material was applied in four coats.

A first coat was applied at an ambient temperature of 65° F. and allowed to dry. The composition appeared to soak into the wood substrate leaving little visual evidence of the applied material. A second coat was then applied and allowed to dry. Visual inspection indicated that the applied second coat had appeared to soak into the wood but, upon close inspection, a fine degree of the applied, dried coating material did appear on the surface of the wood substrate.

After the second coat was thoroughly dried, a third coat was applied to the surface of the wood over the previous two coats. The material adhered to the previously applied coats and formed a glossy surface upon drying which was smooth and dry to the touch.

A final coat was applied after drying. The fourth and final coat was applied over the surface of the previous dried coat. The material was allowed to dry and was visually inspected. The coating material had taken on a luster type finish which was smooth and hard to the touch.

EXAMPLE III

Various wood samples were prepared using wolmanized pinewood cut on the cross grain and on the long grain. The samples were prepared with the coating composition outline in Example I and applied according to the process outlined in Example II. Sample of the wood so treated then were placed in exterior environmental testing locations in Sault Ste. Marie, Mich. and Tempe, Ariz. and Florida to simulate weather conditions in Northern temperate climates, desert conditions and sub tropical conditions.

The samples were visually inspected after two, six, nine, twelve, eighteen and twenty-four months. The samples were resistant to water damage and showed no appreciable degradation or wear.

By way of comparison, wood samples were treated with four coats of BEHR 31-12 alone or BEHR #45 SPAR. Wood sample were placed in the test locations mentioned previously. Degradation was noted in the comparison samples placed in Sault Ste. Marie after approximately six months or upon completion of one winter cycle. The coating material evidenced sufficient degradation after two years to warrant replacement. Thus, it was concluded that the comparison material were not significantly winter-stable.

The samples placed in Arizona were visually inspected at the previously noted intervals. The coating material demonstrated blistering which was pronounced after completing the initial summer cycle. It appeared that the comparison material were not appreciable hot weather stable.

The comparison samples placed in Florida demonstrated a marked tackiness and blistering after approximately six months. It was believed that the comparison material did not exhibit sufficient high-humidity stability.

EXAMPLE IV

Comparison formulations were prepared in which the linseed oil and/or wood penetration agent (MARINE PENETROL) were omitted. When the linseed oil component was omitted, the various other components did not remain in proper admixture. Use of MARINE PENETROL without the linseed oil resulted in a material which was thick and gummy so as to be essentially unusable. The lack of MARINE PENETROL also resulted in a material which did not penetrate into the wood with the efficiency of the composition of the present invention.

What is claimed is:

1. A composition for application on a wood surface, the composition comprising:
    a major portion of a glyceride derivative of at least one of stearic acid, eleostearic acid, palmitic acid, and myristic acid the glyceride derivative present in an amount sufficient to polymerize when applied the wood surface;
    a minor portion of a glyceride derivative of at least one fatty acid from the group which includes linoleic acid, linolenic acid, and oleic acid, the minor portion being present in an amount sufficient to integrate with the major portion; and
    a minor portion of a wood penetration compound, the wood penetration compound comprising at least one castor oil derivative;
    wherein the major and minor portions together comprise a composition active relative to the wood substrate and the active composition is maintained in a volatile carrier medium.

2. The composition of claim 1, wherein the glyceride derivative of at least one of stearic acid, eleostearic acid, palmitic acid and mysteric acid is a drying oil.

3. The composition of claim 1, wherein the minor portion of a glyceride derivative of at least one fatty acid from the group which includes linoleic acid, linolenic acid, and oleic acid is linseed oil.

4. The composition of claim 3, wherein the linseed oil includes oxidation catalysts from at least one of the group which includes organic salts of metals with a valence of at least two.

5. The composition of claim 1, wherein the volatile carrier media is an organic liquid having a boiling point of between 200° F. and 350° F.

6. The composition of claim 5, wherein the organic liquid is an aliphatic hydrocarbon solvent.

7. The composition of claim 6, wherein the organic liquid is present in an amount between 20% by volume and 40% by volume of the total composition.

8. The composition of claim 2, wherein the drying oil is tung oil.

9. The composition of claim 8, wherein the tung oil is present in an amount between 50% and 70% by volume of the total composition.

10. The composition of claim 8, wherein the tung oil comprises a high-grade tung oil component and a medium-grade tung oil component, wherein the high-grade tung oil contains greater than 70% eleostearic acid and the medium-grade tung oil component contains between 50% and 69% eleostearic acid.

11. The composition of claim 10, wherein the high-grade tung oil contains greater than 80% eleostearic acid.

12. The composition of claim 10, wherein the ratio of high-grade tung oil to medium grade is tung oil 1:3 and 1:5, high-grade fling oil to medium-grade tung oil, respectively.

13. The composition of claim 1, wherein the wood penetration compound is a castor oil derivative which includes sulfonated fatty acids having between 16 and 20 carbon atoms.

14. The composition of claim 13, wherein the wood penetration compound is a castor oil derivative from the group including at least one of potassium and sodium salts of sulfated esters of dicarboxylic acids, sodium and potassium salts of sulfo-riconoleic acids, and alkyl ricinoleate sulfate.

15. The composition of claim 14, wherein the wood penetration compound is present in an amount between approximately 1% and approximately 3% by volume of the total composition.

16. A composition for application on a porous substance containing cellulose, the composition comprising:

a major portion of a drying oil which includes at least tung oil, the drying oil present in an amount between 50% and 70% of the total composition volume;

a minor portion of a drying oil which includes at least linseed oil, the minor portion drying oil being present in an amount between 1% and 4% of the total composition volume;

a minor portion of a substrate penetration compound, the substrate penetration compound comprising at least one castor oil derivative, the substrate penetration compound present in an amount between 1% and 3% of the total composition-volume; and a volatile carrier medium, the volatile carrier medium composed of an organic solvent sufficient to make up the balance of the composition.

17. The composition of claim 16, wherein the tung oil drying oil of the major portion comprise a medium grade tung oil component and a high-grad tung oil component present in a ratio of between 3:1 and 5:1, medium-grade tung oil to high-grade tang oil, respectively.

18. The composition of claim 17, wherein the medium grade tung oil contains between 50% and 69% eleostearic acid and derivatives thereof, and the high-grade tung oil components contains greater than 70% eleostearic acid and derivatives thereof.

19. The composition of claim 17, wherein the medium grade tung oil component comprises between 50% and 69% eleostearic acid and its derivatives, and the high-grade tung oil component comprises greater than 80% eleostearic acid and its derivatives.

20. The composition of claim 16, wherein the minor portion drying oil comprises linseed oil and its derivatives, the linseed oil containing an active amount of an oxidation catalyst selected from the group which includes metal salts of organic compounds, the metal salts having a valence of at least two.

21. The composition of claim 20, wherein the oxidation catalyst is a metal salt of at least one of the group which includes linoleates, napthenates and resonates and wherein the metal includes at least one of cobalt, manganese, cerium, lead, chromium, iron, nickel, uranium and zinc.

22. The composition of claim 16, wherein the substrate penetration compound is a castor oil derivative which includes sulfonated fatty acids having between 16 and 20 carbon atoms.

23. The composition of claim 22, wherein the castor oil derivative is from the group including at least one of potassium and sodium salts of sulfated esters of dicarboxylic acids, sodium and potassium salts of sulfo-riconoleic acids, and alkyl ricinoleate sulfate.

24. The composition of claim 23, wherein the cellulose containing substrate is wood.

25. The composition of claim 16, wherein the organic solvent is an aliphatic hydrocarbon having a boiling point of between 200° F. and 350° F.

26. The composition of claim 25, wherein the organic solvent is Stoddard solvent.

* * * * *